Dec. 17, 1957 C. A. RICHARDSON 2,817,083
AIRCRAFT NAVIGATION-AID APPARATUS
Filed Dec. 8, 1953
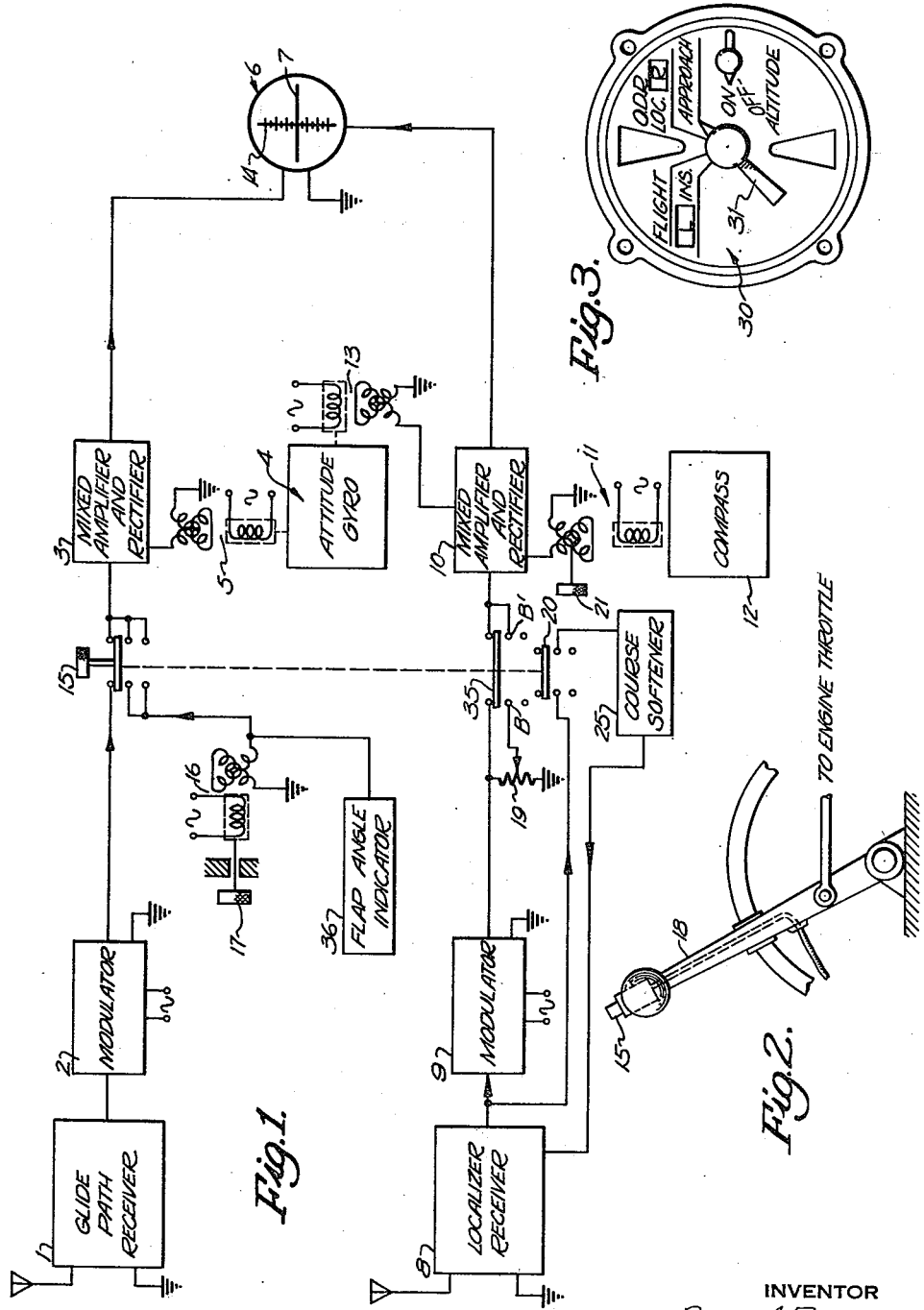
INVENTOR
COLIN A. RICHARDSON
BY
Herbert H. Thompson
his ATTORNEY.

United States Patent Office 2,817,083
Patented Dec. 17, 1957

2,817,083

AIRCRAFT NAVIGATION-AID APPARATUS

Colin Arthur Richardson, Ham Common, England, assignor to The Sperry Gyroscope Company Limited, Brentford, England, a British company Application December 8, 1953, Serial No. 396,887

Claims priority, application Great Britain December 19, 1952

5 Claims. (Cl. 343—108)

This invention relates to aircraft flight control apparatus for use in facilitating the steering of an aircraft and, more particularly, for use in facilitating the safe landing of an aircraft along an inclined landing path or surface, such as a glide-path defined by radio beams.

The invention relates more specifically to such apparatus of the kind in which pitch guidance apparatus for use in controlling the flight of the aircraft in pitch receives as a control signal the combination of signals in appropriate senses including one, derived from radio apparatus, that is a measure of the vertical displacement of the aircraft from the landing path, and another, derived from a pitch-change-sensitive device, that is a measure of the angular deviation in pitch of the aircraft from a preset attitude in pitch.

The pitch guidance apparatus may be, or may form part of, an indicating instrument having an indicator, such as a horizontal pointer, movable relative to a fixed reference index under the control of the flight signal, from which the pilot may guide his aircraft in pitch to proceed along the landing path, or it may be the elevator servo motor of an automatic control system for the aircraft which is energised by the control signal to control the aircraft automatically in pitch to proceed along the landing path.

Aircraft flight control apparatus in which the pitch guidance apparatus forms part of an indicating instrument is disclosed in Patent No. 2,654,086 to Cecil C. Pine and Charles L. Sharp for Safety Device for Instrument Approach Systems, dated September 29, 1953. With the type of flight control apparatus disclosed in that specification the pilot has only to control his aircraft so as to maintain the indicator at a zero position with respect to the fixed reference index in order to ensure that, at least in the absence of a vertical component of wind, the aircraft will proceed down the landing path, or, if vertically displaced from it, will approach it asymptotically in a vertical plane. Such apparatus has now become well-known and has proved extremely advantageous to pilots in cross-country flight, in flying on a directional radio beam, and in flying down a landing beam. Broadly, speaking, such apparatus comprises a crossed pointer meter in which two pointers—a horizontally movable vertical pointer and a vertically movable horizontal pointer—move over a common dial from zero reference positions crossing in the centre of the dial. These pointers are controlled by various combinations of signals according as the aircraft is to be controlled to fly in one or another of several flight paths defined in different ways. In each of the alternative combinations of signals one signal measures the linear or angular displacement of the aircraft from the prescribed path or direction, and one or more of the other signals measures one or more time derivatives of that displacment. Whichever combination of signals is used to control the pointers, the aforesaid method of controlling the aircraft in flight is used, that is, the aircraft is controlled to fly in such a way that the two pointers are maintained at their zero reference positions.

If it is desired to control the aircraft to proceed down a landing path defined by localiser and glide-path beams, the vertically movable horizontal pointer is controlled from a combination of signals including one, derived from a glide-path receiver, that is a measure of the vertical displacement of the aircraft from the glidepath, and another, derived from a pitch-change-sensitive device, that is a measure of the angular displacement of the aircraft in pitch from a preset attitude in pitch. The latter signal may be considered as representing the first time derivative of the vertical displacement from the glide path. The horizontally movable vertical pointer is controlled by a combination of signals including one derived from a localiser receiver that is a measure of the lateral displacement of the aircraft from the localiser path, another derived from a direction-giving instrument that is a measure displacement of the aircraft in azimuth from the direction of the localiser path, and a third derived from an attitude-indicating instrument that is a measure of the bank angle of the aircraft. The two last-mentioned signals may be considered as representing the first and second time derivatives of the lateral displacement of the aircraft from the localiser path.

It will be appreciated that flight control apparatus of the kind described to which the present invention is applicable comprises various auxiliary apparatus such as amplifiers, signal modifiers, combiners and limiters, together with a control panel which includes a selector switch by which the pilot is enabled to select a combination of signals appropriate for the type of flight he wishes to carry out. His control panel may also include various other control knobs such as a pitch-trim knob and an altitude control knob.

As has been stated, the pitch-guidance apparatus may form part of an automatic control system for aircraft. An automatic control system of this kind is also disclosed in Patent No. 2,611,128 to Cecil C. Pine and Charles L. Sharp for Safety Device for Automatic Approach Systems, dated September 16, 1952.

It may be that, during a landing procedure when an aircraft is being controlled either manually from an indicating instrument or automatically through an automatic control system, the pilot may consider, for some reason or another, that his approach to the landing base will not be a satisfactory one, and that therefore he will not wish to land but to fly around the landing base. In such an event it will be appreciated that it is extremely desirable that the pilot should be enabled to modify the controls to the indicating instrument or to the automatic pilot so that he may still be able to make use of them to cause the aircraft to be guided either manually or automatically away from the landing base. In fact it is extremely desirable that the modifying controls should be such that if the aircraft is controlled by the indicator or the automatic pilot in the usual manner, the aircraft will proceed to climb away from the landing base.

A proposal has been made in specification No. 691,017 to provide, in apparatus of the kind referred to, emergency means which are operative to render the pitch-guidance apparatus responsive only to the signal from the pitch-change-sensitive device, and which is also operative to render effective a normally ineffective biasing device that biases the signal from the pitch-change-sensitive device in such a manner that the pitch-guidance apparatus receives an operative signal calling for a climb of the aircraft at a predetermined angle.

It is an object of the present invention to provide an improvement in aircraft flight control apparatus of the kind described in the aforesaid Patents 2,654,086 and 2,611,128.

The desired angle at which an aircraft should climb away from a landing base when the emergency means has been rendered effective varies according to a number of factors, an important one of which is the position of the wing-flaps of the aircraft.

According to the present invention there is provided flight control apparatus of the kind claimed in any one of claims 1 to 13 of specification No. 691,017 including means to ensure that the signal from the pitch-change-sensitive device is biased in such a manner that the operative signal calling for a climb of the aircraft at a predetermined angle is dependent on the flap angle.

On most types of aircraft the flap angle is shown to the pilot by a small indicator on or adjacent to his instrument panel which is operated by a control signal provided by a device for measuring the flap angle. According to a particular embodiment of the present invention this signal that operates the flap angle indicator together with the normal pitch-deviation signal and a biasing signal from the biasing device are supplied in the appropriate senses to control the horizontal vertically-movable pointer when the emergency means is rendered effective.

One form of the invention will now be described by way of example with reference to the accompanying drawings wherein:

Figure 1 is a diagrammatic arrangement of a flight control system embodying the invention, and Figure 2 shows how the switch which transfers the pitch angle control may be associated conveniently with the engine throttle lever.

Figure 3 shows the selector switch usually used in connection with the known zero reading guidance system to which this invention relates.

In the embodiment shown, during radio guided approaches, the output of the radio glide path receiver 1 after passing through the modulator 2 is led to a mixer amplifier and rectifier 3 where this signal is combined with the stabilising pitch signal from the gyro-vertical 4. The pitch signal is represented as generated by a synchro 5 on the pitch axis of gyro 4, which produces a signal proportional in amount to the departure of the craft from a level or trim position and reversible in phase when such departure is up or down. The combined A. C. signal is amplified and rectified and the output led to the zero reading indicator 6 thereby causing movement of the horizontal pointer 7 up or down from its zero or central position, according to whether the aircraft needs trimming up or down to keep it on the glide path.

As explained in the patent to Spencer Kellogg 2d, No. 2,613,350 for Flight Indicating System for Dirigible Craft, dated October 7, 1952, it is characteristic of this type of meter that it indicates zero not only when the aircraft is flying on the glide path (or level), but also when the aircraft has departed from the glide path as soon as its trim has been changed proportionally to the amount of departure to bring the aircraft smoothly back into the glide path.

Similarly, the output of the localiser receiver 8 is led through a modulator 9 and to a mixer amplifier and rectifier 10 where the signal is combined with two other signals, one a course signal from the synchro 11 operated from the compass 12 and the other as signal from the synchro 13 operated from the bank axis of the gyro-vertical 4. The combined output of the three signals is fed to the indicator 6 to cause lateral movement of the pointer 14 to the right or left from its normal or zero position. As with the case of the pointer 7, the pointer 14 will read zero not only when the craft is on the radio course, but also is off course when the craft is banked at a proportional angle proportionate to course departure to cause the craft to return smoothly to its radio course.

An emergency switch or push button 15 is provided which the aviator may press or throw, in case he desires not to land when approaching the touchdown point, but decides to go around again. The pressing of push button 15, it will be seen, will sever the output of the glide path modulator 2 from the mixer rectifier 3, thus leaving the signal from the attitude gyro in sole control to erase the downward glide signal. The gyro signal is also modified to call for a climb, by throwing in a biasing means such as a signal from a synchro 16 which is given a predetermined displacement from knob 17 so as to set in a predetermined pitch signal into the mixer, thus causing the indicator to immediately call for a climb at a safe angle. As the engine speed should be increased simultaneously, we have shown the button as conveniently placed on the engine throttle 18 (Fig. 2), so that the two operations may be accomplished as one.

The same button 15 also preferably either breaks the circuit from the localizer modulator or modifies the signal therefrom to prevent erratic operation of the meter as the craft closely approaches the localiser transmitter. Pressing the button, therefore, also first opens the bridging contact 35 in the circuit between modulator 9 and the receiver 10 and closes a circuit between contacts B and B' thereby placing a signal attenuator in the shape of a variable resistor 19 in the circuit. The magnitude of the resistance is adjusted to such a value that the aircraft, when controlled in accordance with the indicator, never exceeds an angle of bank of 10°, thus avoiding excessive banks while the craft is near the ground. The button is also shown as having a third contactor 20 which throws into the circuit a device 25 for reducing the amplitude of the signals from the localiser receiver as the transmitter is being approached. Such an operation is termed in the art "course softening" and is described in the specification of U. S. Patent No. 2,439,044 to Thomas M. Ferrill, Jr., for Coarse Softening System, dated April 6, 1948. A third position of the switch is shown, in which the localiser receiver is completely disconnected. Under such condition, the craft will still be kept on course by following the zero reading indicator, and if course changes are desired the synchro 11 could be adjusted from the knob 21.

As soon as the craft is safely away from the landing field the pilot, by operating his selector switch 30, may resume the flight system desired by restoring switch 15 to its normal position and by moving the course selector handle 31 to the flight instrument position for regular cross country flight or to the ODR position for radio guided cross country flight or resume the approach position, in which case, by following the indicator 6, the pilot will again cause the craft to approach and reach a landing position over the landing field runway, all as more fully described in the aforesaid Patent No. 2,613,350.

When the pilot decides to forego landing and climb, he adjusts his engine speed and presses the button 15 to cut out the guide path control signal and the signal from the localiser receiver 8 and inserts into the mixer rectifier 3 a predetermined signal from the synchro 5 together with a signal derived from the angular position of the flaps by way of the flap-angle indicator 36.

If, as is usually the case just before landing, the flaps are in an operative position, the climbing angle of the aircraft is greater than it would be with the flaps fully retracted and the attitude of the body of the wing unchanged.

It follows, therefore, that in order to maintain unchanged a desired angle of climb of the aircraft the signal derived from the flap angle must be arranged to increase with decrease of that angle, reaching a maximum when the flap is fully retracted, and must at all times be of a value which, together with the biassing signal from the synchro, keeps the total signal to the mixer constant in magnitude, and of a value consonant with a predetermined angle of climb of the aircraft.

By incorporating the feature of the present invention in aircraft flight control apparatus of the kind referred to it is ensured that the initial climb-away angle of the aircraft is suitable to the flap position existing at the time of rendering the emergency means effective and, as the flaps are retracted during the climb-away procedure, the climb-away angle is modified. In this way an additional safety precaution is introduced into the apparatus.

I claim:

1. A radio approach system for aircraft for facilitating the landing of the aircraft in a landing field comprising pitch-guidance apparatus, a landing beam receiver, a pitch-deviation measuring instrument, means for combining a signal derived from said receiver representing the vertical displacement of the aircraft from a radio-defined landing path with a signal derived from said pitch-deviation measuring instrument representing the angular deviation of the aircraft from a predetermined attitude in pitch and for supplying said combined signals to operate the pitch-guidance apparatus, characterised in that there is provided emergency means which is operative to render the pitch-guidance apparatus responsive only to the signal from the pitch-deviation measuring instrument and which is also operative to render effective a normally ineffective biasing device that biases the signal from the pitch-deviation measuring instrument in such a manner that the pitch-guidance apparatus receives an operative signal calling for a climb of the aircraft at a predetermined angle, and means for modifying said signal when the flap angle on the craft is other than normal.

2. In a guidance and navigational system for aircraft including a radio glide path guidance receiver, a pitch measuring device, a null reading indicator actuated jointly by said receiver and device, for facilitating the landing of the aircraft as claimed in claim 1, in which biasing means are provided for lessening the climbing attitude of the craft when the flaps are down.

3. A system as claimed in claim 2 in which the biasing device produces a signal which is combined with the signal from the pitch-deviation measuring instrument and supplied to the pitch-guidance apparatus as a "fly-up" control signal.

4. In a guidance and navigational system for aircraft including a radio glide path guidance receiver, a pitch measuring device, a null reading indicator actuated jointly by said receiver and device, for facilitating the landing of the aircraft, a safety device for disconnecting at least the glide path radio receiver at will, including means for causing said pitch measuring device to set the indicator to call for a set climbing attitude, and means for automatically varying the indicated attitude when the angle of the flaps on the craft is other than normal.

5. In a blind instrument landing system for aircraft, a null or zero reader pitch attitude indicator, an attitude gyro producing a pitch signal, a radio landing beam receiver producing a signal, said indicator being normally actuated by both of said signals, means for biasing said pitch signal and disconnecting said receiver signal in an emergency, and means for altering said biased signal when the flap angle on the craft is other than normal.

References Cited in the file of this patent

UNITED STATES PATENTS

| | | |
|---|---|---|
| 2,611,128 | Pine et al. | Sept. 16, 1952 |
| 2,654,086 | Pine et al. | Sept. 29, 1953 |
| 2,683,004 | Alderson et al. | July 6, 1954 |